Dec. 8, 1964    D. R. MacFARLANE    3,160,568
NUCLEAR REACTOR
Filed Aug. 15, 1963    2 Sheets-Sheet 1
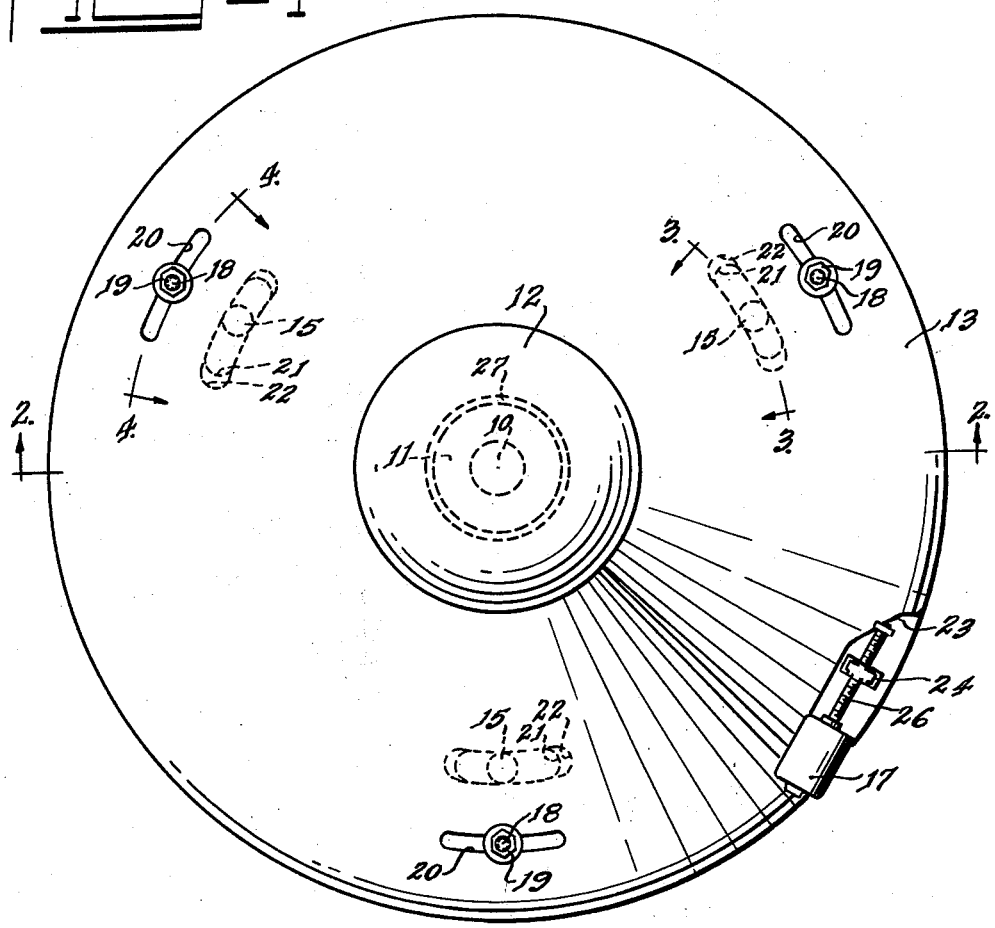
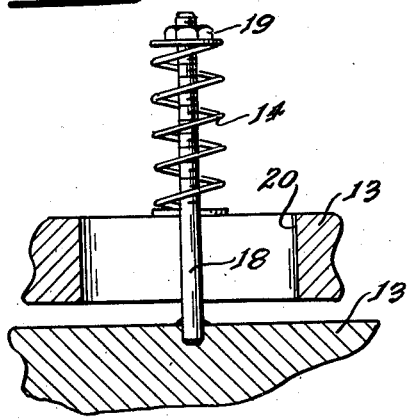
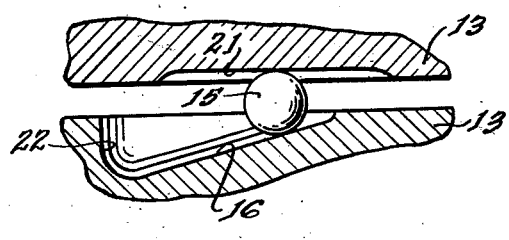
INVENTOR.
Donald R. MacFarlane
BY
Roland G. Anderson
Attorney Dec. 8, 1964    D. R. MacFARLANE    3,160,568
NUCLEAR REACTOR
Filed Aug. 15, 1963    2 Sheets-Sheet 2
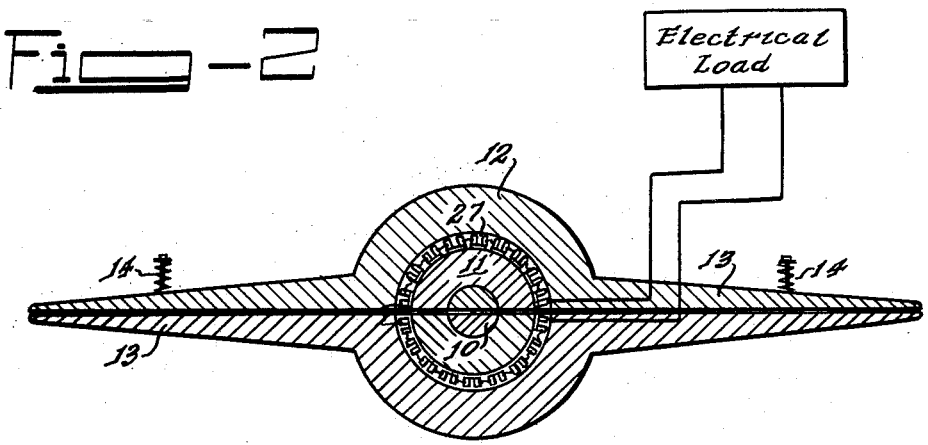
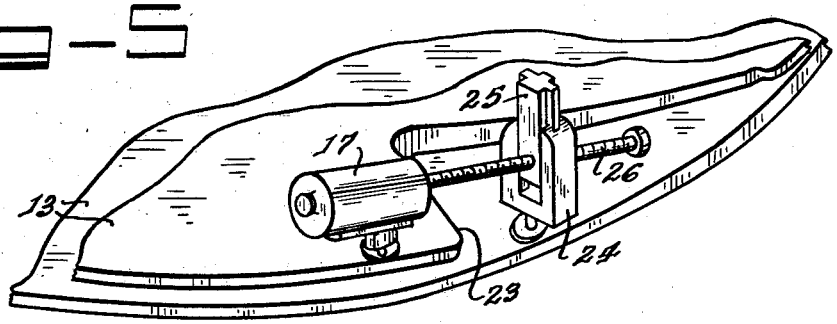
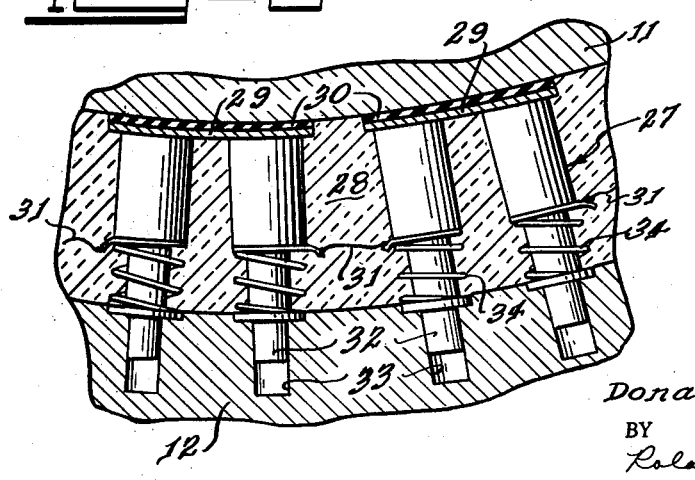
INVENTOR.
Donald R. MacFarlane
BY
Roland A. Anderson
Attorney

3,160,568
NUCLEAR REACTOR
Donald R. MacFarlane, Downers Grove, Ill., assignor to the United States of America as represented by the United States Atomic Energy Commission
Filed Aug. 15, 1963, Ser. No. 302,488
2 Claims. (Cl. 176—29)

This invention relates to a power supply for use in outer space. In more detail the invention relates to a small, minimum-weight, conduction-cooled, direct-conversion nuclear reactor which can be used as a power source in outer space.

An article by William R. Corliss, entitled "Nuclear Power in Outer Space," in Nucleonics magazine for August 1960, discusses in detail power supply requirements for different space missions and potential sources of this power. The author of this article believed that the real promise of nuclear power is in the long-term, high-power ranges where it is uncontested by other sources of power. In still more detail, therefore, the invention relates to a nuclear reactor which is competitive at relatively low power levels with other power sources.

Solar energy is and will be useful for many space missions in the power ranges under consideration. However, the weight of sufficient collectors to attain a power level in this range is a considerable handicap as well as are the facts that solar power plants must be oriented and require energy storage devices to maintain power in shadowed positions. Likewise, power sources employing radioisotopes are potentially available in the power ranges under consideration; however, the cost of such a power plant is little less than that of a nuclear reactor and the limited availability of suitable radioisoisotopes severely limits the potential utility of such power plants.

It is accordingly an object of the present invention to develop a light-weight, inexpensive nuclear reactor for use in space. It will be appreciated, of course, that the reactor is equally operable on earth and may be so operated within a suitable shielded enclosure.

It is a more detailed object of the present invention to develop a conduction-cooled nuclear reactor incorporating thermoelectric elements developing about 200 watts of electrical power.

These and other objects of the present invention are attained in a direct-conversion, conduction-cooled nuclear reactor incorporating a small, high-density, spherical core of U–233 surrounded by a beryllium reflector to which is attached a large, circular, tapered fin, the core, reflector and fin being split along the midplane of the fin. The reactor is controlled by adjusting the distance between halves of the core of the reactor and thermoelectric elements disposed in the reflector convert reactor heat to electric power.

The invention will next be described in connection with the accompanying drawing wherein:

FIG. 1 is a top plan view of a direct-conversion nuclear reactor constructed in accordance with the present invention, FIG. 2 is a vertical sectional view thereof taken on the line 2—2 in FIG. 1, FIG. 3 is an enlarged, vertical, sectional view taken on the line 3—3 in FIG. 1, FIG. 4 is an enlarged, vertical, sectional view taken on the line 4—4 in FIG. 1, FIG. 5 is an enlarged perspective view of the reactor control motor, and FIG. 6 is an enlarged view of the thermoelectric elements used to convert reactor heat directly to electricity.

Referring now to FIGS. 1 and 2 of the drawing, the direct-conversion reactor constructed in accordance with the present invention comprises a core 10 consisting of two solid hemispheres of U–233, which core is surrounded by an inner beryllium reflector 11 and an outer beryllium reflector 12, each also constructed in the form of two equal hemispherical sections. A large tapered circular fin 13, which is split down its midplane into equal sections, is attached to outer reflector 12 to serve as a radiator. Optimization studies show that a single, tapered, circular fin attached to the outer surface of the reflector gives the most efficient radiator for this power supply.

As is apparent from the drawing, the reactor is constructed in two halves with the cleavage between halves extending through the midplane of fin 13. The two halves of the reactor are held closely adjacent by springs 14 which are shown in more detail in FIG. 4 and the two halves of the reactor are spaced apart the desired distance by means of balls 15 in cooperation with inclined surfaces 16 as shown in FIG. 3. Control of the reactor is obtained by varying the spacing between halves of the core 10 by rotating one half of the reactor with respect to the other half with motor 17.

In more detail three pins 18 having nuts 19 at the end thereof are attached to one of the halves of fin 13 and extend through narrow arcuate slots 20 in the other half of fin 13. Springs 14 are compressed against the top of fin 13 by nuts 19 thereby holding the two halves of the reactor together. Also a shallow arcuate groove 21 on the inner surface of one of the halves of fin 13 faces an arcuate groove 22 having inclined surface 16 as bottom thereof on the inner surface of the other half of fin 13. Ball 15 rides in these grooves to space the halves of the reactor the desired distance.

The control mechanism for rotating one half of the reactor with respect to the other half is shown in FIG. 5. As shown, motor 17 is pivotally mounted on fin 13 near the periphery thereof and adjacent a cut-out portion 23 which extends only through one section of the fin. Pivotally mounted on the other half of the fin 13 in cut-out portion 23 is a bracket 24 within which is slidably disposed a lead screw nut 25. Lead screw 26 extends from motor 17 to engage lead screw nut 25.

It will be apparent that operation of motor 17 to extend or retract lead screw 26 will rotate one half of the reactor with respect to the other half, the pivot mounting and slide permitting such movement. As one half of the reactor is moved with respect to the other half, ball 15 will move up or down inclined surface 16 to vary the distance between halves of the reactor core 10. By this means the distance between halves of the reactor core can be varied within a few centimeters which gives enough control for start-up of the reactor and for operating control. Once the reactor is brought to power there is a relatively small amount of control needed from a mechanical control system, since the negative temperature coefficient will effectively hold the power level. A conventional temperaturesensing system (not shown) which measures the temperature difference across a certain segment of the reactor core or reflector and feeds this as an input to the control system can be employed.

The nuclear heat produced in the reactor is converted to electricity by a plurality of conventional thermoelectric elements 27 which are shown in detail in FIG. 6. Thermoelectric elements 27 extend between inner reflector 11 and outer reflector 12 and are surrounded by insulation 28 which may, for example, be asbestos. Pairs of elements 27 are electrically connected by a metal plate 29 which is electrically insulated from inner reflector 11 by a sheet of mica 30. Of each pair of thermoelectric elements, the negative couple is lead telluride doped with 0.10% $PbI_2$ and the positive couple is lead telluride doped with 1.0% sodium. The negative couple of one pair of thermoelectric elements 27 is joined to the positive couple of the next pair of thermoelectric elements 27 by lead 31 so that all thermoelectric elements 27 are connected in series.

A heat-conduction rod 32 of copper extends from the outer end of elements 27 into a cavity 33 in the outer reflector 12. Room is provided in cavity 33 for thermal expansion of elements 27 and a spring 34 is provided surrounding rod 32 to ensure good contact of the thermoelectric elements 27 with metal plate 29 in spite of thermal shrinkage of the elements 27.

In the reactor design shown, the path of heat flow is from the core 10 to the inner reflector 11 and then to the thermoelectric elements 27 in close contact with the inner core. Reject heat flows through heat conduction rods 32 to the outer reflector 12 which acts as the heat sink and conducts the reject heat to fin 13. The beryllium reflector thus serves a dual purpose in acting as a neutron reflector and as a heat sink for the radiator. 40% of the reject heat is dissipated from the surface of outer reflector 12 and 60% is radiated by fin 13.

A part of the beryllium reflector—inner reflector 11—is provided between core 10 and thermoelements 27 to reduce the heat flux at the location of the thermoelements to a level which the material of the thermoelements can withstand without cracking.

The reactor incorporates U-233 as fuel and includes a beryllium reflector because such a reactor combines desired physical characteristics with a low fuel loading and a relatively low total mass. For example, the total mass would be greater if U-235 were employed as fuel and plutonium is excluded from consideration because of its physical characteristics at the desired temperature of operation. Incorporation of a low-density reflector in the reactor results in a saving in total weight and beryllium is superior to all other materials because of its high melting point, light weight and good thermal conductivity. A lower weight can be obtained with a thinner reflector but a 10-cm. beryllium reflector gives a considerably flatter core power distribution than would be expected, making conduction cooling possible. Furthermore, a moderated system having a softer neutron flux would be, in general, larger and heavier than the unmoderated system described.

The following table gives a summary of the parameters of the reactor.

Reactor:
  Fuel _____ U-233.
  Cold clean critical loading (kg.) . 4.3.
  Reflector material _____ Beryllium.
  Reflector thickness (cm.) _____ ~10.
  Radius of core (cm.) _____ 4.
  Outer radius of reflector (cm.) ___ 15.
  Thermal power (w.) _____ 5000.
  Core center temperature (° C.) ___ 764.
  Reactor weight (kg.) _____ 28.
  Control system _____ Separation of halves of reactor.

Thermoelectric generator:
  Thermoelectric material _____ PbTe.
  Power output (w.) _____ 200.
  Output voltage (v.) _____ 12.
  Hot junction temp. (° C.) _____ 593.
  Cold junction temp. (° C.) _____ 343.
  Thermal efficiency (percent) ____ 4.0.
  Number of couples _____ 207.
  Length of couple arms (cm.) ____ 0.68.
  Dia. of n-couple (cm.) _____ 1.18.
  Dia. of p-couple (cm.) _____ 1.57.
  Inner radius of generator (cm.) __ 10.
  Outer radius of generator (cm.) _ 11.
  Weight of thermoelectric
    material (kg.) _____ 4.0.
  Total weight of generator (kg.) __ 10.0.
Radiator:
  Material _____ Beryllium.
  Temperature (° C.) _____ 343 (616° K.).
  Total power radiated (w.) _____ 4800.
  Fin thickness at base (cm.) ____ 5.0.
  Fin thickness at tip (cm.) _____ 0.10.
  Fin diameter (cm.) _____ 70.
  Fin weight (kg.) _____ 13.
Total weight of power supply (kg.) _ 51.
Specific power of power
  supply (w./kg.) _____ 3.9.

It will be noted that the invention is not to be limited to the details given herein but that it may be modified within the scope of the appended claims.

The embodiments of the invention in which an exclusive property or privilege is claimed are defined as follows:

1. A nuclear reactor adapted for use in space, comprising a core consisting of two equal hemispherical bodies of U-233 which are individually noncritical but critical when adjacent, a beryllium reflector surrounding said core, which is thicker than the optimum from weight considerations, a large, circular, tapered beryllium fin attached to said reflector, said reflector and said fin being split into equal sections along the midplane of the fin, means for varying the distance between the two bodies of U-233 to control the reactor including facing arcuate slots on the inner faces of the beryllium fin sections, one of said slots having a slanting bottom, a ball situated in said slots, means for holding the fin sections against the ball, and means for rotating one half of the reactor with respect to the other half to vary the distance between halves of the reactor, and a plurality of thermoelectric elements for converting reactor heat into electricity intermediate of said reflector a uniform distance from the core.

2. A nuclear reactor according to claim 1 wherein said means for holding the fin sections against the ball comprises pins having nuts at the end thereof, said pins being attached to one of the fin sections and extending through arcuate slots in the other fin sections and springs surrounding said pins which are compressed between said nuts and one of said fin sections and the means for rotating one half of the reactor with respect to the other half comprises a motor pivotally mounted on the fin near the periphery thereof and adjacent a cut-out portion extending through one section of said fin, a lead screw operated on by said motor, a bracket pivotally mounted in said cut-out portion on the other section of the fin, and a lead screw nut engaging said lead screw slidably mounted in said bracket.

References Cited by the Examiner

UNITED STATES PATENTS

| | | | |
|---|---|---|---|
| 2,902,423 | 9/59 | Luebke et al. | 176—40 |
| 2,993,850 | 7/61 | Soodak et al. | 176—21 X |
| 3,005,766 | 10/61 | Bartnoff | 176—40 |
| 3,075,030 | 1/63 | Elm et al. | 136—4 |

CARL D. QUARFORTH, *Primary Examiner.*

REUBEN EPSTEIN, *Examiner.*